United States Patent [19]

Murphy et al.

[11] Patent Number: 4,474,346
[45] Date of Patent: Oct. 2, 1984

[54] COLLAPSIBLE COWL STRUCTURE FOR GAS-TURBINE ENGINE STRUT

[75] Inventors: Patrick Murphy; Bertan J. Roundy, both of Bellevue; Stuart K. Wood, Seattle, all of Wash.

[73] Assignee: The Boeing Company, Seattle, Wash.

[21] Appl. No.: 394,773

[22] PCT Filed: Mar. 26, 1982

[86] PCT No.: PCT/US82/00373
§ 371 Date: Mar. 26, 1982
§ 102(e) Date: Mar. 26, 1982

[87] PCT Pub. No.: WO83/03396
PCT Pub. Date: Oct. 13, 1983

[51] Int. Cl.$^3$ .................... B64D 27/00; F01B 25/16; F16M 13/00
[52] U.S. Cl. .................... 244/54; 244/121; 60/39.091; 60/39.31; 415/9; 248/554
[58] Field of Search ................ 244/54, 121; 248/554–557; 60/39.091, 39.31, 39.32; 415/9, 174

[56] References Cited

U.S. PATENT DOCUMENTS

| | | | |
|---|---|---|---|
| 4,037,809 | 7/1977 | Legrand | 244/54 |
| 4,055,041 | 10/1977 | Adamson et al. | 244/54 |
| 4,065,077 | 12/1977 | Brooks | 244/54 |
| 4,361,296 | 11/1982 | Hall et al. | 244/54 |

Primary Examiner—Trygve M. Blix
Assistant Examiner—Ivy M. Shum
Attorney, Agent, or Firm—Nicolaas DeVogel; B. A. Donahue

[57] ABSTRACT

Aircraft gas-turbine engines (10) are often mounted and supported by strut type structures (12) which contain fuel, oil, electrical and hydraulic engine supply lines. The engine fan (18) is surrounded by a belt (24) made of tough flexible material designed to restrict travel of broken fan blade pieces, ingested objects or other debris (20). The forward strut section (12), adjacent the belt (24), is located outside of the maximum belt deflection envelope (26) except for the engine right and left cowl hinges (62 and 64) and its support structure (30), which structure (30) is made collapsible. This collapsible cowl hinge structure (30) utilizes mechanical fuse connections (68) which upon a dislocation force from the belt (24) allows the structure (30) to disconnect from the strut support structure (12). The collapsible cowl hinge structure (30) will successively move outwards and return, without severe damage to strut, cowl, strut fairing or supply lines (50 and 52) in the event debris (20) hits the belt (24) adjacent the forward strut portion.

6 Claims, 8 Drawing Figures

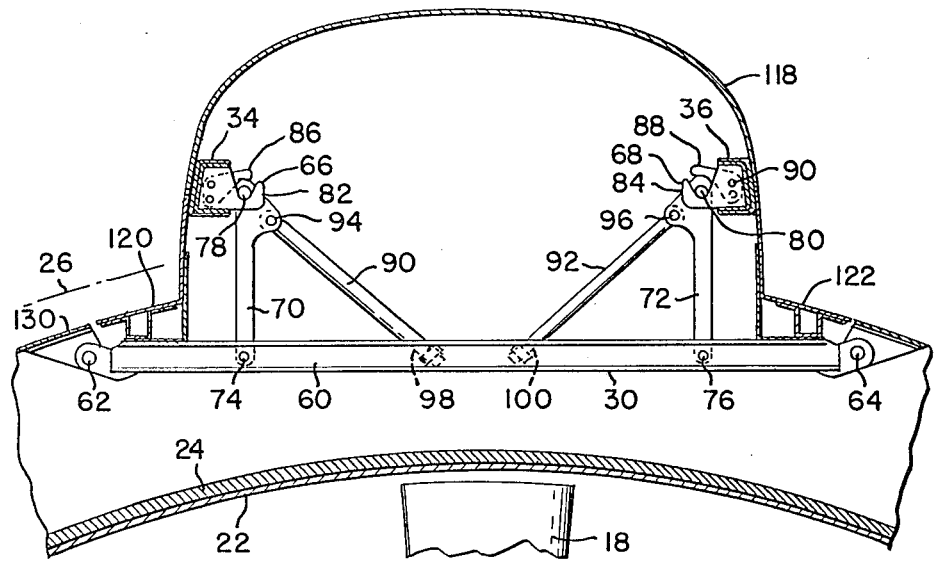
FIG. 3
FIG. 4
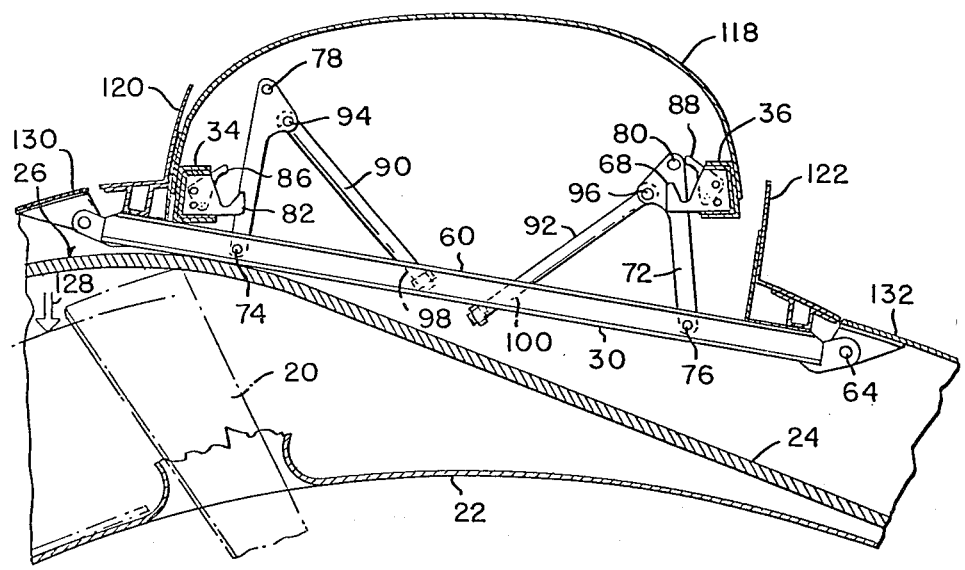

COLLAPSIBLE COWL STRUCTURE FOR GAS-TURBINE ENGINE STRUT

BACKGROUND OF THE INVENTION

This invention relates to a gas-turbine engine strut and cowl structure and in particular to a collapsible cowl safety support structure therefor.

One of the most recent safety improvements in gas-turbine engines has been the development of a fan case containment system, hereinafter called belt, made of strong flexible material surrounding the engine fan area. This flexible belt serves to restrain, contain and catch all flying debris which if ingested by the engine or originated from broken fan pieces which, when not restrained, could damage, cut or short out the engine fuel, oil, electrical and other supply lines causing engine fire and related disasters. The belt is made somewhat similar to the construction of a bullet proof vest, utilizing layers of tough, flexible Kevlar material or the like and capable of restraining or containing most of the free flying objects.

Since the vital supply lines to the engine are carried by the strut and are deployed adjacent the fan area, a revised, improved structural protection, which converts a portion of the hard or permanent conventional structure of the strut into a collapsible structure appeared advisable. Accordingly, the present invention provides for (1) a system interface, which clears the maximum belt deflection envelope and (2) a collapsible right and left fan cowl support hinge structure which is capable of moving outward, to at least clear the maximum belt deflection envelope, and thereby protect the strut structure from rupture or upset.

Because the present safety collapsible cowl hinge structure and arrangement has been designed for the first engine that employed the recent developed fan blade containment belt, there is no prior art that relates to a similar arrangement.

SUMMARY OF THE INVENTION

The airplane strut structure which supports the engine includes a cowl hinge structure. In general, the engine cowlings are hingedly attached to the right and to the left side of the cowl hinge structure. The present invention provides for a safety collapsible cowl hinge structure in the area of the engine fan so that upon fan belt deflection, due to fan blade failings or other debris, the deflection will not cause damage to structural areas carrying fuel and electrical conduits, but the deflection force is contained and absorbed in the nearest located cowl hinge structure due to its collapsible capability.

The cowl hinge structure is partly located within the maximum deflection envelope of the fan protection belt, which location approximately coincides with the forward strut-engine area. The cowl hinge structure includes a substantially horizontally positioned hinge beam which carries at each end a thereon mounted cowl hinge. The hinge beam is connected to the strut structure by a right and a left collapsible triangular structural arrangement, comprising a right and a left vertically extending beam-chord linkage between the hinge beam and the right and left strut chord. In the presently preferred configuration, each beam-chord is pivotally mounted to the hinge beam and solidly connected via a breakaway mechanical fuse arrangement to the right and left chord, respectively. The breakaway arrangement at the upper part of the linkages employs a bracket provided with a riveted, mounted locking clip, which rivets will shear and cause a disconnection at an upward force or load. In order to carry side loads to the cowling hinges during normal operation, a right and a left tension load linkage is substantially diagonally mounted between the linkage beam and the upper portion of the chord beam linkage thus forming the right and left triangular configuration. However, in order to obtain the collapsible features of the cowl hinge structure at belt deflection situations, due to debris forces as explained above, the tension linkage mountings at the hinge beam are slidably arranged while the connection to the upper portion of the beam-chord linkage is pivotally arranged. Accordingly, when a belt deflection occurs, the hinge beam will be dislocated in a substantially upward direction which causes a disconnection at the breakaway bracket connections and successively pivoting and sliding motions at the various linkage connections and thereafter a substantially realignment and repositioning of the cowl hinge structure due to the recovery or reaction forces of the temporarily upset cowling structures.

The strut structure, strut chords and the strut fairing have not been harmed, while the fairing structures between the cowling and the forward strut fairing may break away and will have to be replaced, however, such damage is insignificant in comparison to the prevented possible disaster and/or structual damage that would occur without the utilization of the herein disclosed invention.

DESCRIPTION OF THE DRAWINGS

FIG. 3 is a view taken on line 3—3 of FIG. 2.

FIG. 4 illustrates the event when a broken fan blade piece ruptures the engine casing and is caught by the containment belt.

DETAILED DESCRIPTION OF THE INVENTION

Figure 1:
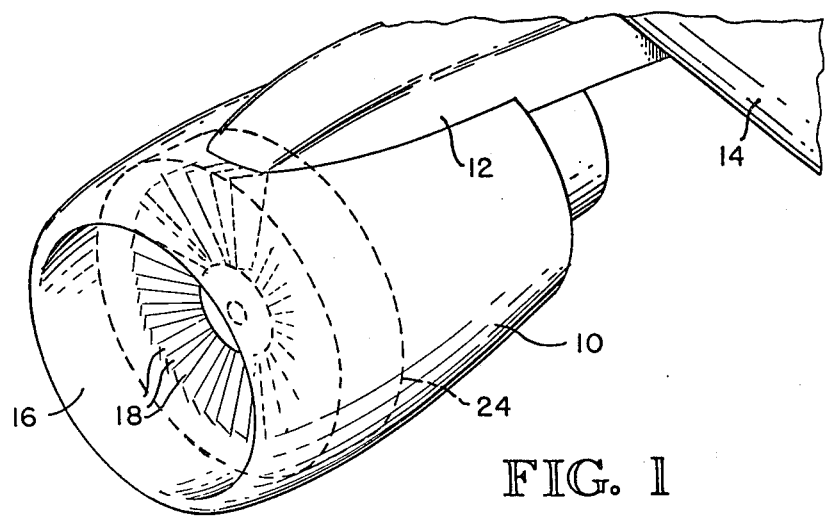
FIG. 1 illustrates an aircraft engine provided with a fan blade containment belt, and the forward strut support area adjacent the belt, which is the subject of the present invention.

Most present day commercial aircraft are powered by gas-turbine engines 10 which are mounted by struts 12 to the wing 14, as illustrated in FIG. 1. Within the engine intake area 16 is a high speed rotating fan blade assembly carrying fan blades 18.

As explained above, failure of fan blades, broken pieces, etc., or other debris 20 may travel towards the engine casing 22 when subjected by centrifugal forces and penetrate the casing 22, endangering other components. For added protection a tough, expandible Kevlar type material or the like has been installed around the engine casing 22, forming a belt 24, which serves to catch and hold objects 20 which have penetrated the casing 22 as is illustrated in FIG. 4. However, the belt 24 expansion or deflection envelope 26 intersects with the cowl hinge structure 30.

Figure 2:
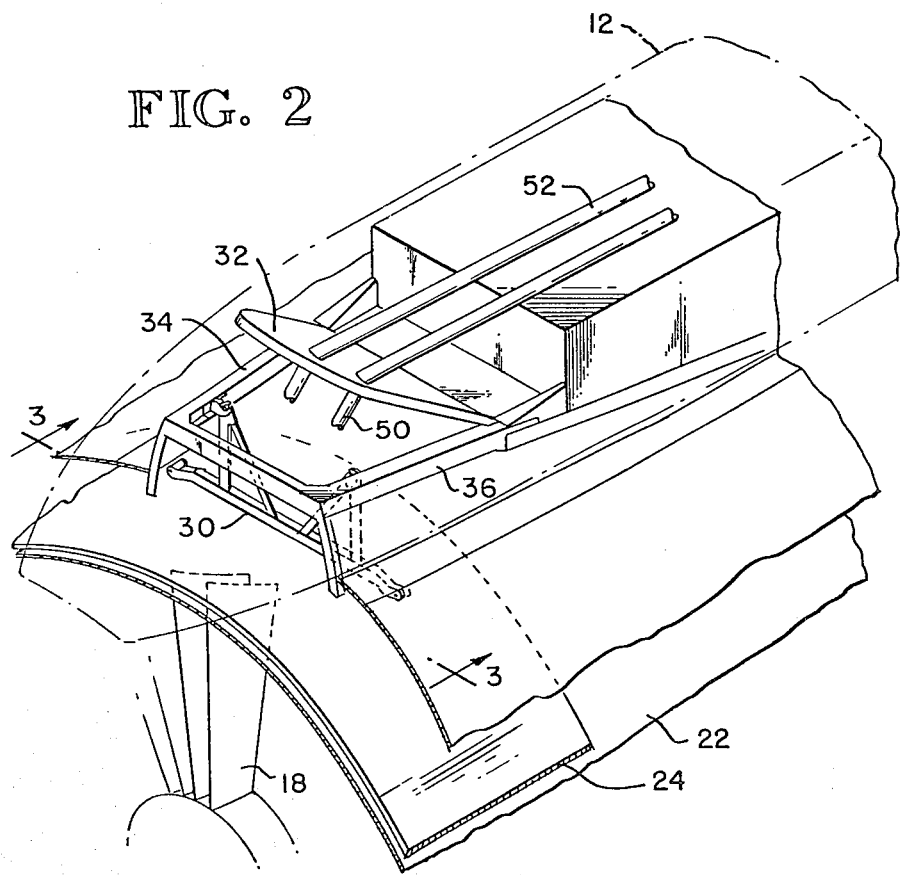
FIG. 2 is an isometric view of the forward strut support structure enclosing the collapsible cowl hinge support structure.
Figure 5:
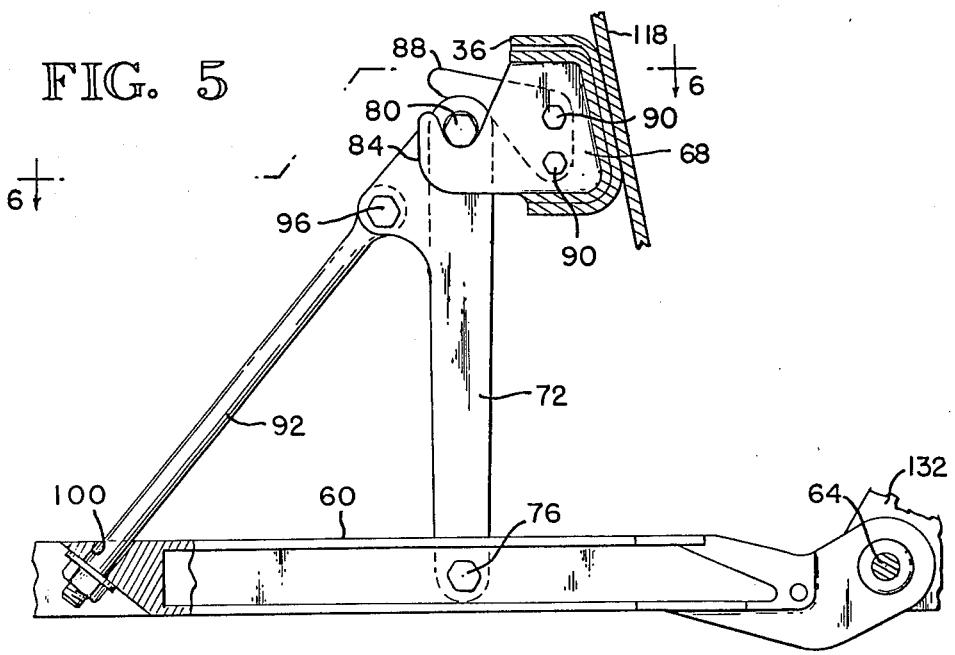
FIG. 5 is an enlarged illustration of one side of the collapsible cowl hinge structure.
Figure 6:
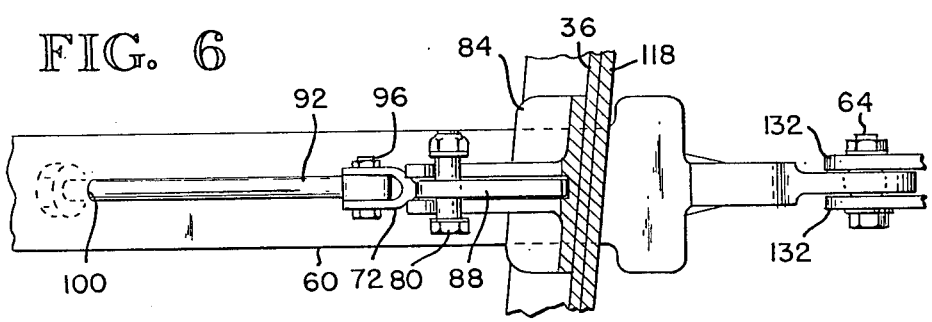
FIG. 6 is a plan view taken on line 6—6 of FIG. 5.

Referring to FIGS. 2 and 3, the cowl hinge structure 30 is adjacent engine fuel 50 conduits, oil conduits 52 and other hydraulic or electrical connections which, via the conventional fire wall 32, bypass the structure 30 towards other engine locations (not shown). As will be understood, upset or dislocation of a conventional cowl hinge support structure which was integrally connected with the strut structure 12 would cause immediate danger through severed fuel and shorted electrical conduits. Accordingly, the presently disclosed cowl hinge structure 30 has been made collapsible and thus may become independent of the strut structure 12 and its main support chords 34 and 36, as illustrated in FIG. 4.

The collapsible cowl hinge structure 30 comprises a horizontally positioned hinge beam 60 carrying a left and a right cowl hinge 62 and 64. The beam 60 is mounted to the strut chords 34 and 36 by a breakaway means or mechanical fuse arrangement 66 and 68. The particular arrangement may be accomplished many different conventional ways, however, the preferred arrangement is shown in FIGS. 2-6 and in detail in FIGS. 5 and 6. The beam-chord linkages 70 and 72 are pivotally connected to the beam 60 by bolts 74-76 and at their upper ends by bolts 78-80, kept within brackets 82 and 84 and clips 86 and 88. The clip 86 or 88 is riveted by rivets 91, which will shear when an upwards directed load occurs, thus disconnecting the beam-chord linkage 70 or 72 from the strut struture 12. Diagonally positioned tension load linkages 90 and 92 are pivotally mounted to the upper portion of the beam-chord linkage and are slidably mounted to the beam at the openings 98 and 100. Upon collapsing action, the tension load linkages 90 and 92 may travel through the beam openings 98 and 100 as illustrated in FIG. 4.

Figure 7:
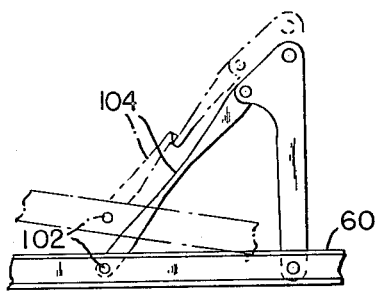
FIGS. 7 and 8 are alternate connection arrangements for the diagonal linkage shown in FIG. 5 and its possible displacement at the event shown in FIG. 4.

In a different embodiment as illustrated in FIG. 7, the connection to the beam 60 is made via a bolt 102, and the tension linkage 104 is made of a thin, foldable tension load material so that the linkage 104 may fold upon action and unfold due to the cowling reaction repositioning forces.

Figure 8:
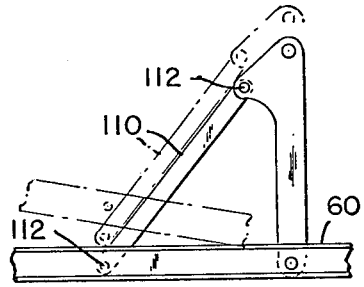

The embodiment shown in FIG. 8 comprises a sturdier diagonal tension linkage 110 which is connected to the beam 60 at one or both ends by a breakaway or mechanical fuse bolt 112 which will shear at a predetermined load.

It should be understood that the maximum deflection envelope 26 as illustrated in FIG. 4, where the belt hits the beam at the hinge 62 is just an exemplary showing. The point of impact may occur anywhere along the length of the beam 60. Also, it should be noted that the strut fairing 118, the strut chords 34 and 36 remain in their original location, since they are being part of the strut structure 12. The fairing structures 120 and 122 will become folded and damaged and will have to be replaced. The reaction load 128 which is due primarily to the upset of the cowl hinge 62 and/or 64 and its thereon connected cowling structures 130 and/or 132, will reposition the collapsed cowl hinge structure 30, as a moveable mechanism, into the approximate original position as shown in FIG. 3. Engine out situations may be prevented by the herein disclosed invention, which may improve the safety of aircraft operation. It should be understood that the herein disclosed and described invention is illustrated as an example only and in its preferred embodiment, and furthermore that various changes could be affected which would provide an increased energy absorption in the collapsible structural arrangement 30 or would collapse or reposition the cowl hinge structure 30 in a slightly different mode, however, it is intended that such changes and modifications are within the spirit and scope of the present invention as claimed hereinafter.

We claim:

1. A safety collapsible cowl hinge support structure for strut supported gas-turbine engines provided with a fan blade containment deflection belt, comprising in combination:

(a) a hinge beam having a right and a left cowl hinging arrangement located outside of said belt perimeter but within said belt maximum deflection envelope, (b) a right and a left support linkage interconnecting said beam to said strut associated right and left strut-chord by pivotal and mechanical fuse breakaway means so that upon deflection force of said belt, said belt may contact and dislocate said beam resulting in a collapsing and disconnecting action of said support linkages whereby said cowl hinge structure becomes disconnected from said strut-chord structure leaving said strut-chord structure undisturbed.

2. A safety collapsible cowl hinge support structure for strut supported gas-turbine engines provided with a fan blade containment deflection belt, comprising in combination:

(a) a hinge beam carrying a right and a left cowl hinge arrangement, said hinge beam located outside of said belt perimeter but within said belt maximum deflection envelope;

(b) a right and a left support linkage, each pivotally connected to said beam and each connected via a breakaway means to said strut associated right and left chord respectively;

(c) a right and a left tension load linkage, each mounted to said right and left support linkage, respectively, near said breakaway means and each connected to said beam at a spaced location from said right and from said left support pivotal beam connection, respectively; and (d) whereby upon deflection of said belt, said deflection action may upset said beam causing said breakaway means to disconnect said support linkages from said right and left chord.

3. A safety collapsible cowl hinge support structure for strut supported gas-turbine engines provided with a fan blade containment deflection belt, as claimed in claim 2, wherein said right and said left tension load linkage are each pivotally mounted to said right and said left support linkage near said breakaway means and wherein each said tension load linkage is connected in slidable breakaway fashion to said beam.

4. A safety collapsible cowl hinge support structure for strut supported gas-turbine engines provided with a fan blade containment deflection belt, as claimed in claim 2, wherein said right and said left tension load linkage are each pivotally mounted to said right and said left support linkage near said breakaway means and wherein each tension load linkage is connected in pivotal relationship to said beam, and upon compression load said tension linkage are adapted to fold.

5. A safety collapsible cowl hinge support structure for strut supported gas-turbine engines provided with a fan blade containment deflection belt, as claimed in claim 2, wherein said right and said left tension load linkage are each pivotally mounted to said right and said left support linkage near said breakaway means and wherein each said tension load linkage is pivotally connected to said beam and wherein said pivotal connections of said tension load linkages are such that upon compression load to said tension linkage at least one of said pivotal connections are adaptable to shear.

6. A forward collapsible strut structure for airplane engines employing a forward fan protection belt and wherein the collapsible strut structure comprises the cowl engine hinge beam assembly mounted to the strut chords, the improvement characterized by
 (a) a right and a left, substantially vertically extending beam-chord linkage mounted in apart relationship of one another from said hinge beam to said right and left strut chord via a breakaway means, respectively; and
 (b) a right and a left diagonally positioned linkage mounted operationally to said right and left beam-chord linkage and operationally to said hinge beam so that a right and a left triangular and collapsible structure is formed having said hinge beam as a common base and whereby upon upset force by said belt, said beam upwards movement will disconnect said beam-chord from said breakaway means while said operational mountings, said beam-chord linkages and said diagonal linkages provide for a collapsible structure independent of said strut chords and thereon connected associated structures.

* * * * *